United States Patent Office 3,575,877
Patented Apr. 20, 1971

3,575,877
PREPARATION OF CALCIUM-CONTAINING ALKALINE EARTH METAL HALOPHOSPHATE PHOSPHORS FREE OF TRICALCIUM PHOSPHATE
Hugh C. Bertsch, St. Louis, Mo., assignor to Mallinckrodt Chemical Works, St. Louis, Mo.
No Drawing. Filed June 12, 1968, Ser. No. 736,279
Int. Cl. C09k 1/36
U.S. Cl. 252—301.4                                   3 Claims

ABSTRACT OF THE DISCLOSURE

Calcium-containing alkaline earth metal halophosphates prepared by precipitation at temperatures not exceeding 56° C. are essentially free of beta-tricalcium phosphate (TCP) as a secondary phase. The presence of TCP disrupts the normal relationship between manganese content and the color quality of the light emitted by a halophosphate phosphor containing manganese as an activator. Presumably, this is due to preferential absorption of manganese by the secondary TCP phase.

BACKGROUND OF THE INVENTION

The present invention relates to the field of inorganic chemistry, and more particularly to processes of preparing calcium-containing alkaline earth metal halophosphates by precipitation.

It is well known that activated calcium-containing alkaline earth metal halophosphates are widely used as the luminescent coating material in the familiar fluorescent electric lamps. The nature and compositions of such halophosphate phosphors are adequately described in the patent and journal literature. Representative of these is the disclosure of A. H. McKeag and P. W. Ranby in U.S. Pat. 2,488,733, granted Nov. 22, 1949. As indicated therein these halophosphate phosphors are more or less analogous to the naturally occurring mineral, apatite. In preparing such phosphors trivalent antimony is normally incorporated as the primary activator and bivalent manganese as a secondary activator. The manganese level has an important effect on the color quality of the emitted light.

While halophosphate phosphors are commercially prepared by extended firing, at high temperatures, of suitable highly purified and finely powdered source compounds, several precipitation processes for preparing such compositions have been suggested.

British Pat. 717,653 (1954) discloses a process in which a cold alkaline solution of ammonium phosphate and ammonium fluoride is added to a slurry of antimony trioxide in a solution of calcium and manganese chlorides. The resulting precipitate is dried and fired to yield a halophosphate phosphor.

Netherlands Pat. 83,992 (1956) discloses a process in which a solution of calcium and manganese nitrates and a strongly alkaline solution of ammonium fluoride and ammonium phosphate are metered simultaneously into a slurry of antimony trioxide at 80° C. The resulting precipitate is dried and converted to calcium fluorochloro-apatite by firing in an atmosphere of HCl.

Recently, D. J. Frese, R. S. Schreiber and H. C. Bertsch (coassigned U.S. patent application Ser. No. 610,772, filed Jan. 23, 1967, now abandoned, and coassigned, copending U.S. continuation patent application Ser. No. 9,103, filed Feb. 9, 1970) developed an improved precipitation method for the preparation of halophosphate phosphors. This process involves mixing at least two aqueous reactant solutions containing phosphate, fluoride and activator ions and bivalent metal ions and isolating, drying and firing the resulting precipitate. Precipitation at room temperature and at 60–90° C. is disclosed.

Roger D. Piper (coassigned U.S. patent application Ser. No. 646,493, filed June 16, 1967, now abandoned and coassigned, copending U.S. continuation patent application Ser. No. 7,408, filed Feb. 6, 1970, discloses the preparation of apatite-type fluorescent compositions by processes involving first precipitating an intermediate that is deficient in at least one essential component, then digesting the intermediate in a solution containing the missing ions. A brief firing period develops the fluorescent capacity of the product to the conventional range.

There is a practical advantage in carrying out the precipitation at elevated temperatures. As is pointed out in the Frese et al., application, in most cases the precipitate obtained at or near normal room temperature consists of extremely small crystallites. This product has a gel-like structure that is very difficult to filter and wash. Moreover the product normally dries in the form of extremely hard lumps. Precipitates made at elevated temperatures (60–90° C.) normally result in the formation of relatively uniform granular precipitates which are much more easily filtered and washed than are the products precipitated at room temperature. However, such precipitates normally contain beta-tricalcium phosphate as a secondary phase.

SUMMARY OF THE INVENTION

It is an object of the present invention to provide an improved process for preparing calcium-containing alkaline earth metal halophosphate compositions by precipitation. It is a further object to provide such improved methods which substantially avoid the occurrence of beta-tricalcium phosphate in the fired product.

In accordance with the present invention, it has now been found that there is a critical temperature in the preparation of calcium-containing alkaline earth metal halophosphates by methods such as that disclosed by Frese et al. It has been found that when such precipitations are carried out at temperatures not exceeding 56° C. the only significant secondary phase occurring in the fired phosphor is a pyrophosphate phase. When the precipitation is carried out at temperatures exceeding 56° C., a tricalcium phosphate phase is the significant secondary phase. As will be pointed out below, this is particularly important in the preparation of calcium-containing alkaline earth metal halophosphate phosphors in which manganese is used as an activator.

It is well known that the proportion of manganese present in a calcium-containing alkaline earth metal halophosphate phosphor has an important effect on the color quality of the light emitted by the phosphor. It is therefore important in the production of phosphors designed to emit light of a particular color quality, that the proportion of manganese be controlled rather closely, and that factors which would affect the normal relationship between color quality and manganese content be rigorously avoided.

While it is desirable to minimize the presence of either a calcium pyrophosphate or a tricalcium phosphate phase in an alkaline earth metal halophosphate phosphor, it has now been found that the latter is particularly deleterious. This is due to the fact that the presence of a tricalcium phosphate phase distorts the normal relationship between manganese content and the color quality of the emitted light. This is evidenced by a lower proportion of red in the emitted light than would normally be expected from the manganese content of the phosphor.

It has been postulated that a tricalcium phosphate phase selectively absorbs manganese, leaving a relatively smaller proportion of manganese to act as an activator in the halophosphate lattice. Such a theory is consistent with the observed facts.

Regardless of the accuracy of the theory outlined above, it has been found, in accordance with the present invention, that if the precipitation of a calcium-containing alkaline earth metal halophosphate is carried out at a temperature not exceeding 56° C., the resulting fired phosphor is substantially free of a tricalcium phosphate phase and the color quality of the emitted light is consistent with what would be expected from a knowledge of the manganese content of the total composition.

While the data set out below demonstrate that precipitates substantially free of beta-tricalcium phosphate as a secondary phase are obtained by precipitation at either room temperature or at elevated temperatures up to 56° C., it is preferred that the precipitation be carried out at temperatures close to but not exceeding 56° C.

DESCRIPTION OF THE PREFERRED EMBODIMENTS

EXAMPLE 1

A series of eight calcium-containing alkaline earth metal halophosphate phosphors was prepared by precipitation from aqueous solution by the general method of Frese et al. (U.S. patent application Ser. No. 610,772, filed Jan. 23, 1967). The only significant variation in process conditions was with respect to the precipitation temperature. This varied from 24 to 83° C. in the series, but the temperature of the slurry in each preparation was held constant during the entire precipitation process.

For each preparation a cation solution (1000 ml.) was prepared to contain the following ingredients:

$CaCl_2$—188.5 g.
Hydrochloric acid (37% HCl)—24.5 ml.
$SrCO_3$—2.67 g.
$CdCO_3$—3.12 g.
$MnCl_2$—6.99 g.
$Sg_2O_3$—3.96 g.

The strontium and cadmium carbonates and the antimony trioxide dissolved in the acid solution, so that a clear solution was formed.

Similarly, a series of anion solutions was prepared, each containing 143.2 g. $(NH_4)_2HPO_4$ and 11.17 g. $NH_4F$ in a total volume of 1500 ml. The anion solutions also contained ammonium hydroxide, the amount varying with the precipitation temperature in order to achieve reasonably uniform final pH levels.

In each case the cation and anion solutions were added, with stirring, at stoichiometrically equivalent rates, to 600 ml. of water during a period of 60–75 minutes. In each case the temperature of the precipitation slurry was held constant within ±1° C. throughout the precipitation period. The variations in process conditions are shown in Table 1.

TABLE 1

| Process variable | Run | | | | | | | |
| --- | --- | --- | --- | --- | --- | --- | --- | --- |
| | A | B | C | D | E | F | G | H |
| Temperature of precipitation ° C. | 24 | 28 | 42 | 51 | 56 | 59 | 73 | 83 |
| Volume of reagent $NH_4OH$ (27% $NH_3$) in anion solution, (ml.) | 78 | 80 | 84 | 88 | 89 | 89 | 98 | 110 |
| Final pH of slurry | 7.3 | 7.5 | 7.8 | 7.4 | 7.9 | 6.9 | 7.5 | 7.6 |

The washed products were dried at 125° C., then ignited at 1050° C.—one portion in a covered crucible in air and a second portion in a nitrogen atmosphere.

Complete chemical analyses were obtained by conventional wet methods. The results, converted to a molar basis, for the portions ignited under nitrogen are shown in Table 2. Comparable results were obtained on the portions ignited in air. (The theoretical manganese content is 0.31% Mn.)

TABLE 2.—ANALYSIS OF HALOPHOSPHATE PHOSPHORS FIRED IN NITROGEN

[Expressed in terms of atomic/ionic proportion of halide and metal ions/6 moles $PO_4$]

| Phosphor | Gram atoms per 6 moles of $PO_4$ | | | | | | |
| --- | --- | --- | --- | --- | --- | --- | --- |
| | Ca | Cd | Sr | Mn | Sb | F | Cl |
| A | 8.76 | 0.07 | 0.09 | 0.30 | 0.05 | 1.58 | 0.01 |
| B | 8.75 | 0.07 | 0.09 | 0.30 | 0.06 | 1.63 | 0.02 |
| C | 8.85 | 0.07 | 0.09 | 0.29 | 0.06 | 1.60 | 0.06 |
| D | 8.81 | 0.07 | 0.09 | 0.29 | 0.04 | 1.55 | 0.06 |
| E | 9.03 | 0.07 | 0.08 | 0.30 | 0.07 | 1.65 | 0.10 |
| F [1] | 9.57 | 0.08 | 0.09 | 0.32 | 0.09 | 1.75 | 0.02 |
| G | 9.34 | 0.07 | 0.09 | 0.31 | 0.05 | 1.64 | 0.05 |
| H | 9.29 | 0.07 | 0.09 | 0.30 | 0.07 | 1.57 | 0.03 |

[1] The data suggest that the phosphate value reported on this sample are low.

X-ray diffraction patterns show that a small proportion of beta-$Ca_2P_2O_7$ is presented as a secondary phase in phosphors A–E, and that a small proportion of beta-$Ca_3(PO_4)_2$ is present in phosphors F–H.

Intercomparisons of the intensity of the emitted light and of its color quality were made by examining the output of plaques irradiated by short wave U.V. (2537 A.) light by means of the Spectra Brightness Spot Meter (Photo Research Corp., Hollywood, Calif.). This is a filter photometer whose response to "white" light may be adjusted to approximate that of the human eye. Such photometer readings are shown as "Luminance" values in Table 3. Readings were also made with red and blue filters, indicating the relative intensities of the red and blue components of the emitted light. In Table 3 the red and blue values shown represent values in which the actual photometer readings with the red and blue filters, respectively, were corrected to a standard luminance value of 80 for more ready comparison of the color quality of the emitted light from the various phosphors. The data in Table 3 were obtained from the phosphors ignited in nitrogen. Similar results were obtained for those ignited in air.

TABLE 3.—COMPARATIVE PHOTOMETER READINGS FOR EMITTED LIGHT FROM PHOSPHOR PLAQUES UNDER 2,537 A IRRADIATION

[Red and blue values corrected to standard luminance of 80]

| Phosphor | Luminance | Red, corrected | Blue, corrected |
| --- | --- | --- | --- |
| A | 89.5 | 51.5 | 17.5 |
| B | 87 | 51.5 | 18 |
| C | 86 | 54 | 19.5 |
| D | 85 | 54 | 19.5 |
| E | 81 | 55 | 20.5 |
| F | 74 | 48.5 | 37 |
| G | 72 | 47 | 37.5 |
| H | 67 | 45 | 44.5 |

It will be noted that the comparable values in Table 3 for phosphors A–E are reasonably uniform. These phosphors were precipittaed at temperatures not exceeding 56° C. It will also be noted that the red component in the light from phosphors F–H, (which were precipitated at temperatures above 56° C.) is significantly weaker than that in phosphors A–E.

EXAMPLE 2

Two additional series of phosphors similar to those of Example 1 but with manganese levels of 0.19 and 0.55 gram atom Mn, respectively, per six moles $PO_4$, were prepared and evaluated by methods similar to those described in Example 1. The results were generally comparable, although in the high Mn series the shift in color quality corresponding to precipitation temperatures higher than 56° C. was not as pronounced as at lower Mn levels.

In view of the above, it will be seen that the several objects of the invention are achieved and other advantageous results attained.

As many changes could be made in the above processes without departing from the scope of the invention, it is intended that all matter contained in the above description shall be interpreted as illustrative and not in a limiting sense.

What is claimed is:

1. In a process for preparing a calcium-containing alkaline earth metal halophosphate phosphor by admixture of at least two reactant solutions, the summation of which contains the constituent ions of said phosphor, and precipitation of said phosphor from the admixed reactant solutions, the improvement which comprises carrying out the precipitation at a temperature of about 56° C. to yield a product which, when ignited, is substantially free of a tricalcium phosphate phase.

2. A process as defined in claim 1 wherein the alkaline earth metal component is predominantly calcium.

3. A process as defined in claim 2 wherein the phosphor contains manganese as an activator.

References Cited

FOREIGN PATENTS 717,653  10/1954  Great Britain _____ 252—301.4P

ROBERT D. EDMONDS, Primary Examiner